United States Patent [19]

Ishikawa et al.

[11] Patent Number: 4,944,822
[45] Date of Patent: Jul. 31, 1990

[54] METHOD FOR PRESS-BONDING LAMINATED ASSEMBLY

[75] Inventors: Kenichi Ishikawa; Koji Kurita; Satoru Fukawa; Kenji Maeda, all of Yokohama, Japan

[73] Assignee: Asahi Glass Company Ltd., Tokyo, Japan

[21] Appl. No.: 236,163

[22] Filed: Aug. 25, 1988

[30] Foreign Application Priority Data

Aug. 25, 1987 [JP] Japan .................... 62-209297
Sep. 8, 1987 [JP] Japan .................... 62-223171

[51] Int. Cl.⁵ .................................. B32B 31/20
[52] U.S. Cl. ........................ 156/212; 156/104; 156/285; 156/286; 156/382
[58] Field of Search ............. 156/382, 104, 286, 285, 156/212

[56] References Cited

U.S. PATENT DOCUMENTS

| | | | |
|---|---|---|---|
| 3,881,043 | 4/1975 | Rieser et al. | 428/81 |
| 3,994,760 | 11/1976 | Park | 156/104 X |
| 4,062,887 | 12/1977 | Chang et al. | 560/185 |
| 4,180,426 | 12/1979 | Oustin et al. | 156/104 |
| 4,218,500 | 8/1980 | Rädisch | 156/285 X |
| 4,362,587 | 12/1982 | Baudin et al. | 156/104 X |
| 4,425,406 | 1/1984 | Palma | 156/382 X |

FOREIGN PATENT DOCUMENTS

194555 9/1986 European Pat. Off.

OTHER PUBLICATIONS

Chemical Abstracts, vol. 88, 1978, p. 78, Abstract No. 122793y, Columbus, Ohio; U.S.A.; & JP-A-77 129 000(Toray Silicone Co., Ltd) 28-10-77 *Abstract*.

Primary Examiner—Robert A. Dawson
Assistant Examiner—Michele K. Yoder
Attorney, Agent, or Firm—Oblon, Spivak, McClelland, Maier & Neustadt

[57] ABSTRACT

A method for press-bonding a laminated assembly of a sheet material and a plastic film, which comprises providing on at least the peripheral portion of the sheet material and/or the plastic film a primer layer capable of adhering the sheet material and the plastic film at room temperature, stacking the sheet material and the plastic film to form a laminated assembly, evacuating a first vacuum compartment defined by the sheet material and the plastic film to a vacuumed condition and at the same time, evacuating a second vacuum compartment enclosing at least the plastic film side of the first compartment, to a vacuumed condition, and then introducing atmospheric air into the second vacuum compartment to release it from the vacuumed condition and thereby to press-bond the plastic film to the sheet material.

10 Claims, 6 Drawing Sheets

METHOD FOR PRESS-BONDING LAMINATED ASSEMBLY

The present invention relates to a method for producing a laminated product. Particularly, it relates to a method for press-bonding a laminated assembly of a sheet material such as a glass sheet and a plastic film for the production of e.g. a safety glass.

For the production of a laminated product such as a laminated safety glass comprising a glass sheet and a plastic film, a method is known wherein a cover glass sheet having the same shape as the safety glass to be produced is put on a plastic film of a laminated assembly of a glass sheet and the plastic film, and the glass sheet and the plastic film are heat press-bonded by means of a rubber bag for preliminary press-bonding, followed by removing the cover glass sheet to obtain a laminated safety glass, for example, in Japanese Unexamined Pat. Publications No. 194533/1983 and No. 194534/1983. This method is applicable to the heat press-bonding of a plastic film made of a thermoplastic material. However, when applied to a thermosetting resin film, this method had a drawback that dents were likely to be formed on the surface by dust or foreign matters present at the interface, and a high level of dust free chamber was required. Further, it was likely that the cover glass broke and damaged the plastic surface.

Japanese Examined Pat. Publication No. 12140/1983 also discloses a method for the production of a laminated product of this type. According to this method, when a plastic film is to be laminated on a flat surface of a sheet material, such a plastic film is placed on an inflatable diaphragm with its peripheral edge secured in a vacuum compartment, a sheet material is horizontally disposed so that the side to be laminated with the plastic film faces the plastic film, then the diaphragm is inflated by controlling the pressures of both sides of this diaphragm to press the above plastic film to the surface of the sheet material and thereby press-bond the plastic film to the sheet material. In this method, the plastic film is likely to adhere to the diaphragm, and it is not easy to take out the laminated product from the apparatus. Especially when the shape of the sheet material is complicated, it becomes difficult to initiate the contact of the diaphragm from the central portion, and the press-bonding is likely to start at a plurality of points, whereby marks are likely to remain on the plastic film. Further, when an inflatable silicon rubber sheet is used for pressing the plastic film, there is a drawback that the silicone oil component tends to transfer to the plastic film and the degree of fogging on the surface of the plastic film is likely to vary. Further, the present applicants have proposed in Japanese patent application No. 51271/1985 a process for producing a safety glass of a bi-layer type by means of a vacuum packaging bag and a vacuum packaging apparatus. As shown in FIG. 8, this process comprises heat-sealing the peripheral portion of a plastic film 3 to be laminated and a backing film 72 except one side for an opening, to form a vacuum packaging bag 71, placing a sheet material 2 in the vacuum packaging bag, evacuating a vacuum compartment 10 from a vacuuming duct 75, heat-sealing the opening 74 of the vacuum packaging bag by a heat-sealing means 73, and heating the entire vacuum packaging bag to a predetermined temperature for heat press-bonding. According to this process, a good laminated product can be prepared. However, the backing film 72 will be wasted without being used as a material constituting the laminated product. Thus, there has been a drawback that the process is costly.

The present applicants have further proposed in Japanese patent application No. 214137/1986 a process for producing a laminated product such as a safety glass of a bi-layer type by means of a glass support table. In this process, a first vacuum-compartment 20 comprising a plastic film 3 and a support table 13 is used as shown in FIG. 9. The plastic film is preliminarily thoroughly cleaned to remove dust and secured to a plastic film-holding apparatus 14. A sheet material 2 is also preliminarily thoroughly cleaned to remove dust and placed on the support table 13. The plastic film-holding apparatus 14 having the plastic film 3 secured thereto is secured on the support table 13 to form the first vacuum compartment 20. A clamp is used as a means for securing the plastic film. After evacuating the first vacuum compartment 20 and the second vacuum compartment 10 from vacuuming ducts 16 and 18, atmospheric air is introduced from the duct 16 to release the vacuumed condition except the first vacuum compartment 20, whereby the plastic film 3 is press-bonded to the sheet material 2. Then, the periphery of sheet material 2 is heated by a heater 23 for edge-sealing the plastic film 3 and the sheet material 2. After cooling, the extra plastic film around the sheet material is removed, and the laminated product is taken out. By this process, it is possible to obtain a good laminated product. However, this process has drawbacks that the securing of the plastic film along the periphery of the support table is cumbersome, the plastic film is required to be larger in size relative to the glass sheet, and the extra portion of the plastic film larger than the glass sheet is wasted, thus leading to a high cost. This process also had a drawback that a heat resistant expensive support table is required.

It is an object of the present invention to provide a method for press-bonding a laminated assembly of a sheet material and a plastic film for the production of a laminate having a plastic film laminated on at least one side of a sheet material, particularly for the production of a laminate for a safety glass having a plastic film laminated on at least one side of a glass sheet, whereby a laminated product of good quality can be obtained without bringing about various defects such as irregularities, wrinkles, scars, deformations or see-through distortions to the plastic film, the production cost is low, and a mass production can readily be made.

Firstly, the present invention provides a method for press-bonding a laminated assembly of a sheet material and a plastic film, which comprises providing on at least the peripheral portion of the sheet material and/or the plastic film a primer layer capable of adhering the sheet material and the plastic film at room temperature, stacking the sheet material and the plastic film to form a laminated assembly, evacuating a first vacuum compartment defined by the sheet material and the plastic film to a vacuumed condition and at the same time, evacuating a second vacuum compartment enclosing at least the plastic film side of the first vacuum compartment, to a vacuumed condition, and then introducing atmospheric air into the second vacuum compartment to release it from the vacuumed condition and thereby to press-bond the plastic film to the sheet material.

Secondly, the present invention provides a method for press-bonding a laminated assembly of a sheet material and a plastic film, which comprises providing on at least the peripheral portion of the sheet material and/or the plastic film a primer layer capable of adhering the sheet material and the plastic film at room temperature, stacking the sheet material and the plastic film to form a laminated assembly, placing the laminated assembly in a first vacuum compartment defined by a cover film, evacuating the first vacuum compartment to a vacuumed condition and at the same time, evacuating a second vacuum compartment enclosing the first vacuum compartment, to a vacuumed condition, and then introducing atmospheric air into the second vacuum compartment to release it from the vacuumed condition and thereby to press the cover film to the laminated assembly surface so that the plastic film is press-bonded to the sheet material.

Thirdly, the present invention provides a method for press-bonding a laminated assembly of a sheet material and a plastic film, which comprises stacking a sheet material and a plastic film to form a laminated assembly, placing the laminated assembly in a first vacuum compartment defined by a cover film having a roughened surface on the side facing the plastic film of the laminated assembly, evacuating the first vacuum compartment to a vacuumed condition and at the same time, evacuating a second vacuum compartment enclosing the first vacuum compartment, to a vacuumed condition, and then introducing atmospheric air into the second vacuum compartment to release it from the vacuumed condition and thereby to press the cover film to the laminated assembly surface so that the plastic film is press-bonded to the sheet material.

Now, the present invention will be described in further detail with reference to the preferred embodiments.

In the accompanying drawings, FIGS. 1 to 4 diagrammatically illustrate various structures of the laminated product 1 produced by the process of the present invention.

FIG. 1 is a cross-sectional view of a laminated product wherein a plastic film 3 is laminated on one side of a sheet material 2.

FIG. 2 is a cross-sectional view of a laminated product wherein a plastic film 3 is laminated on one side of a sheet material 2 having an adhesive layer 4 interposed therebetween.

FIG. 3 is a cross-sectional view of a laminated product 1 wherein a plastic film 3 is laminated on one side of a sheet material 2 having an adhesive interlayer 5 interposed therebetween.

Figure 1:
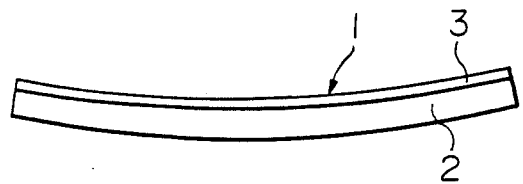
Figure 2:
Figure 3:
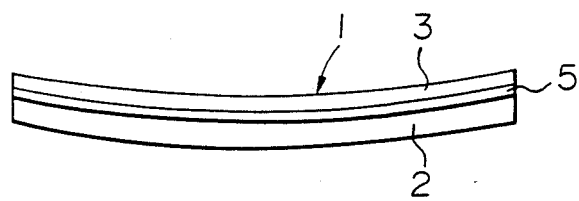
Figure 4:
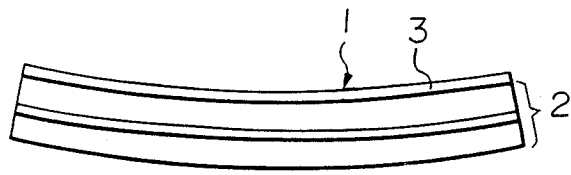
FIG. 4 is a cross-sectional view of a laminated product wherein a plastic film 3 is laminated on one side of a laminated type sheet material 2.

In the drawings, reference numeral 1 designates a laminated product, 2 a sheet material or glass sheet, 3 a plastic film, 4 an adhesive layer, 5 an adhesive interlayer, 6 a primer layer for adhesion, 10 a second vacuum compartment, 13 a support table, 14 a film-holding apparatus, 15 a circumferential frame, 16 and 18 vacuuming ducts, 21 a peripheral vacuuming duct, 23 a pheripheral heater, 29 a cover, 30 a base, 31 a packing, 32 a cover film, 33 a backing film, 35 and 36 gaskets, 37 and 71 vacuum packaging bags, 72 a backing film, 73 a heat seal, 74 a sealing portion, 75 a vacuuming duct, and 76 an air inlet.

The sheet material 2 in the present invention is a substrate on which a plastic film is laminated. An inorganic glass sheet or a plastic sheet made of a polycarbonate, an acrylic resin or various other plastics, may be mentioned as typical examples. However, the sheet material is of course not restricted to such examples. There is no particular restriction also as to the shape of the sheet material 2.

As the plastic film 3, various plastic films may be employed depending upon the particular purposes, including, for instance, a thermoplastic film, a thermosetting film, a laminated plastic film composed of a plurality of layers of thermoplastic and thermosetting films, a plastic film having an adhesive layer 4 formed on the side to be laminated onto the sheet meaterial 2, or a plastic films subjected to various treatments.

A representative example of the laminate of the present invention is a safety glass wherein the sheet material is a transparent glass sheet and a plastic film is laminated on the glass sheet to improve the safety in case of the breakage of the glass sheet. Such a safety glass is useful for automobiles, railway vehicles, ships, aircrafts or other various transportation vehicles, or for construction or building purposes, or for various apparatus. In such a safety glass, the plastic film is transparent and has a function to minimize the damages to the skin in case of the breakage of the glass sheet upon collision and a function to provide penetration resistance, abrasion resistance, etc. As typical examples, there may be mentioned, for instance, a laminated plastic film comprising a polyethylene terephthalate film, a nylon film or a self-healing type thermosetting polyurethane film and an adhesive interlayer such as polyvinyl butyral or an ethylene-vinyl acetate copolymer; a plastic film such as a polyethylene terephthalate film, a nylon film or a self-healing type thermosetting urethane film, having an adhesive layer on the side to be bonded to the glass sheet; a single layered or double layered polyurethane film such as a plastic film having a thermoplastic urethane layer on the side to be bonded to the glass sheet and a self-healing type thermosetting urethane layer on the other side; or a plastic film of a thermoplastic urethane having the surface reformed.

It is most preferred to have the entire surface of the plastic film to be bonded to the sheet material, embossed to facilitate and ensure adequate deaeration for press-bonding. Such embosses preferably have a depth of from 0.5 to 5 $\mu$m, more preferably from 1.0 to 2.5 $\mu$m. Further, various treatments such as corona discharge treatment may be applied to improve the adhesion of the film constituting the plastic film.

The glass sheet for the above-mentioned safety glass may be subjected to bending treatment or reinforcing treatment, or may be provided partially or entirely with a transparent surface coating, a translucent coating or an opaque surface coating such as a conductive coating, a heat ray reflecting coating, a color coating or a hard coating. The thickness of the glass sheet is usually from 1.0 to 20 mm, particularly from 2 to 6 mm for automobiles.

The primer is applied to adhere the plastic film and the sheet material along their periphery and keep them in the adhered state during the press-bonding, and it has an adhesive property at room temperature. It may be a solution obtained by diluting e.g. a thermoplastic polyurethane with a solvent such as dioxane. However, the primer is not restricted to such a specific example. Such a primer is applied, prior to the stacking of the sheet material and the plastic film, to at least the peripheral portion of either one or both of the sheet material and the plastic film in a predetermined thickness of e.g. from 0.5 to 10 μm. From the viewpoint of the application efficiency, it is convenient to apply it along the periphery of the sheet material. In some cases, the application of such a primer may be omitted.

Figure 5:
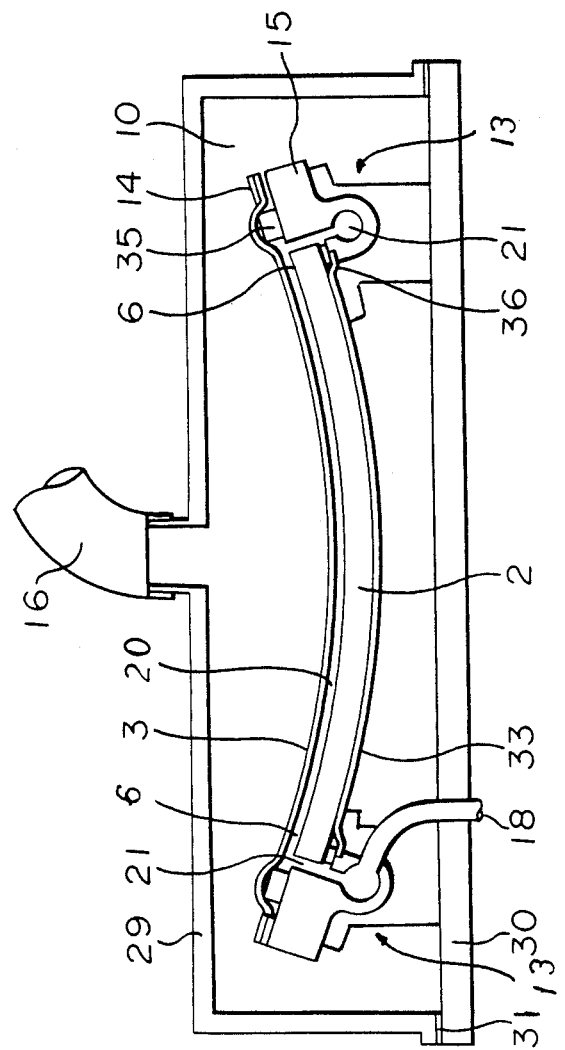
FIG. 5 illustrates one embodiment of the method of the present invention.

FIG. 5 illustrates an embodiment of the method for the production of a laminated product according to the present invention, wherein reference numeral 3 is a plastic film to be laminated, numeral 2 is a sheet material on which the plastic film 3 is laminated, numeral 14 is a film holding apparatus for spreading the plastic film, numeral 33 is a backing film which supports the sheet material and which forms a first vacuum compartment 20 together with the plastic film, numeral 10 is a second vacuum compartment, numeral 16 is a vacuuming duct for evacuating the second vacuum compartment 10 and numeral 18 is a vacuuming duct for evacuating the first vacuum compartment 20 via vacuuming ducts 21 along the periphery. In this apparatus, the plastic film 3 is disposed to cover the entire upper surface of the sheet material 2. The plastic film 3, the backing film 33, and the circumferential frame 15 and the gaskets 35 constitute the first vacuum compartment 20 within the second vacuum compartment 10 which is separate from the first vacuum compartment. This vacuum compartment 20 is located within the vacuum compartment 10 defined by a cover 29 and a base 30, but it is independent from the second vacuum compartment 10. The vacuum compartments 10 and 20 are designed so that evacuation and introduction of atmospheric air can be conducted through the vacuuming duct 16 and the vacuuming ducts 18 and 21, respectively, by vacuum pumps (not shown).

The circumferential frame 15 has a shape corresponding to the peripheral shape of the sheet material and may be made of wood, metal, resin or ceramics or their composite. One or a plurality of vacuuming ducts 21 which form a part of and are along the periphery of the frame are provided to connect the first vacuum compartment 20 and the vacuuming duct 18. The vacuuming ducts 21 along the periphery may be continuous.

The backing film 33 may be made of any material so long as it is capable of following the shape of the sheet material 2 and is no -adhesive. The backing film 33 may be omitted if the sealing between the sheet material 2 and the gasket 36 is adequate.

Referring to the apparatus of FIG. 5 as described above, firstly, the sheet material 2 thoroughly cleaned to remove dust and provided with a primer for peripheral adhesion in order improve the adhesive force along the periphery, is mounted in the apparatus. Then, the plastic film 3 thoroughly cleaned to remove dust and spread by the film holding apparatus 14 is placed on the periphery of the gasket 35 of the circumferential frame 15. If the sealing between the gasket 35 and the plastic film 3 is inadequate, the frame 14 may be secured to the circumferential frame 15.

Then, the cover 29 for the vacuum compartment is placed, and the second vacuum compartment 10 and the internal first vacuum compartment 20 are then evacuated through the vacuuming ducts 16 and 18, respectively, to the vacuumed conditions. Then, atmospheric air is introduced into the second vacuum compartment 10 to release it from the vacuumed condition, whereby the plastic film 3 is press-bonded to the sheet material 2 with the primer interposed therebetween. The press-bonded laminated product is finished by trimming the excess portion of the plastic film 3 along the edge of the sheet material 2.

Figure 6:
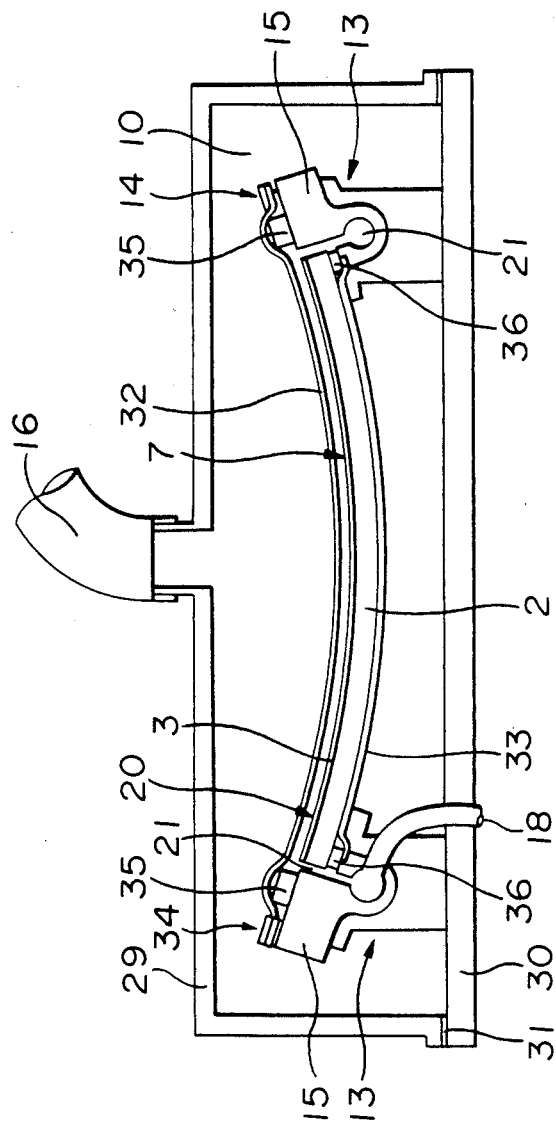
FIG. 6 illustrates another embodiment of the present invention.

Instead of the embodiment of FIG. 5, it is possible to employ a vacuum packaging bag made of a cover film 32 as shown in FIG. 6. The cover film 32 is designed to apply the vacuum pressure uniformly to press-bond the plastic film 3 and the sheet material 2. The cover film has a roughened surface on the side facing the plastic film so that it will not stick to the surface of the plastic film 3 and deaeration from the space between the glass sheet 2 and the plastic film 3 can be facilitated. If the surface roughness is too coarse, the corresponding marks are likely to remain in the plastic film after the press-bonding. On the other hand, if the surface roughness is so low, deaeration will be insufficient. Therefore, the surface roughness is provided preferably by embosses of from 0.5 to 70 μm, more preferably from 2 to 40 μm, or by a texture having a surface roughness of this level is used. As such material, for example, a film, flexible sheet or cloth of polyurethane, nylon, polyethylene, polyester or other plastics is used. If necessary, a reinforcing material may be provided along the peripheral or other portions of the cover film. This method is similar to the embodiment of FIG. 5 except that the first vacuuming compartment is replaced by the vacuum packaging bag, and the basic operation for evacuation is the same.

The laminated product sealed with the primer at least along the periphery, or without such a primer, by the operation of FIG. 5 or 6, is then heated or, if necessary, heat-pressed in an autoclave under a pressure of from 2 to 10 kg/cm² for adequate bonding of the plastic film to the sheet material. The bonding temperature varies depending upon the material of the plastic film or the adhesive layer. For example, when a thermoplastic polyurethane is used as the adhesive layer, the temperature is usually at a level of from 60° to 160° C., preferably from 80° to 140° C. The operation in the autoclave may be conducted after the heat treatment under atmospheric pressure, or may be conducted directly without such heat treatment. The autoclave treatment is usually conducted at a temperature of from 80° to 160° C. under a pressure of from 2 to 10 kg/cm² for from 15 minutes to two hours.

The above-mentioned heat treatment is unnecessary when adequate bonding of the sheet material and the plastic film is obtained by the vacuum treatment in the vacuum packaging bag without the heat treatment in the heating chamber or in the autoclave.

Of course, the operation for the press-bonding of the laminated assembly of the heat material and the plastic film in the vacuum chamber may be conducted simultaneously with respect to a plurality of laminated assemblies, or may be conducted continuously.

The illustrated vacuum chamber is defined by a cover 29 detachably mounted on a base 30 so that a sheet material may be introduced into the vacuum chamber. When the cover is placed on the base, the hermetic sealing of the vacuum chamber is maintained by the packing 31. Various types of systems or mechanisms may be employed for the opening and closing of the vacuum chamber for the introduction of the plastic film or the sheet material into the vacuum chamber.

Now, the present invention will be described in further detail with reference to Examples. However, it should be understood that the present invention is by no means restricted to such specific Examples.

EXAMPLE 1

A curved glass sheet (thickness: 3.5 mm) of a size of 1,400 mm×700 mm with a depth of curvature of 50 mm having a baked print of black ceramics color ink with a width of 25 mm along the periphery, was washed with a washing agent and thoroughly cleaned for dust removal. Then, with a width of 20 mm along the periphery of the glass sheet, a urethane primer for the peripheral adhesion was applied in a thickness of from 2 to 5 μm.

On the other hand, as the plastic film, a plastic film having a two layer strucure comprising a thermosetting polyurethene layer (thickness: 1.0 mm) having a self-healing property on the exposed surface side and a urethane adhesive layer (thickness: 0.02 mm) on the side to be bonded to the glass sheet, was prepared.

This plastic film was cut into a size larger by 50 mm beyond the periphery of the glass sheet and attached to the film holding apparatus 14 along the peripheral portion. The glass sheet surface and the plastic film surface were thoroughly cleaned for dust removal. A laminated assembly having a plastic film 3 overlaid on the glass sheet 2 and provided on its periphery with a primer 6, was prepared.

The supporting outline of the support 13 was slightly larger than the outline of the glass sheet 2, and the support is made of an epoxy resin and has a structure as shown in FIG. 5.

The glass sheet 2 was placed on the support 13 and the plastic film 3 was stacked on the glass sheet 2 to form the laminated assembly 7 shown in FIG. 5 and secured by the film holding apparatus 14 as shown in FIG. 5. Then, the first vacuum compartment 20 comprising the glass sheet 2, the plastic film 3 and the backing film 33 was formed in the second vacuum compartment 10 so that preliminary bonding of the glass sheet 2 and the plastic film 3 can be conducted by deaerating the space between the glass sheet 2 and the plastic film 3. Then, the cover 29 of the second vacuum compartment 10 was closed and the second vacuum compartment 10 and the first vacuum compartment 20 were evacuated through the vacuuming duct 16 and the vacuuming duct 18, respectively, to a level of 1 mmHg. Then, atmospheric air was introduced from the vacuuming duct 16 into the second vacuum compartment 10 outside the first vacuum compartment 20 to release the second vacuum compartment 10 from the vacuumed condition, whereby the plastic film 3 was press-bonded to the glass sheet 2, and the glass sheet 2 and the plastic film 3 were sealed with the primer interposed therebetween. The laminated assembly was then taken out. Then, the excess portion of the plastic film 3 larger than the glass sheet 2 was cut off along the edge of the glass sheet. The laminated assembly was then put in an autoclave and heat pressed at 140° C. under a pressure of 5 kg/cm² for 30 minutes.

The laminated product thus obtained had no scars or see-through distortion on the surface of the plastic film 3 and had an excellent see-through property. Further, no peeling of the baked print of black ceramic color ink was observed.

EXAMPLE 2

A curved glass sheet (thickness: 3.5 mm) of a size of 1,400 mm×700 mm with a depth of curvature of 40 mm was washed with a washing agent and thoroughly cleaned for dust removal.

On the other hand, as the plastic film, a plastic film of a two-layer structure comprising a thermosetting polyurethane layer (thickness: 1.0 mm) having a self-healing property on the exposed surface side and a urethane adhesive layer (thickness: 0.02 mm) on the side to be bonded to the glass sheet, was prepared.

This plastic film was cut to have a size corresponding to the glass sheet. The glass sheet surface and the plastic film surface were thoroughly cleaned for dust removal. Then, with a width of 20 mm along the periphery of the glass sheet, a urethane primer for the peripheral adhesion was applied in a thickness of from 2 to 5 μm. A laminated assembly having the plastic film 3 overlaid on the glass sheet 2 was prepared.

The supporting outline of the support 13 was slightly larger than the outline of the glass sheet 2. The support was prepared from an epoxy resin and had a structure as shown in FIG. 6.

The laminated assembly 7 comprising the glass sheet 2 and the plastic film 3 was placed on the inner supporting edge of the circumferential frame 15 of the support 13 with the gasket 36 interposed therebetween as shown in FIG. 6. A film holding apparatus 14 to which a cover film 32 provided to be covered over the plastic film 3 was attached, was placed on the circumferential frame 15 with a gasket 35 interposed therebetween, and secured. Then, a first vacuum compartment constituted by the cover film 32, the backing film 33, the cover film-holding apparatus 14 and the gaskets 35 and 36 and containing the laminated assembly 7 of the glass sheet 2 and the plastic film 3, was formed in the second vacuum compartment 10, so that the space between the glass sheet 2 and the plastic film 3 can be deaerated for preliminary press-bonding. Then, the cover 29 of the vacuum compartment 10 was closed, and the second vacuum compartment 10 and the first vacuum compartment 20 were evacuated from vacuuming ducts 16 and 18, respectively, to a level of 1 mmHg. Then, atmospheric air was introduced from the vacuuming duct 16 into the vacuum compartment 10 outside the first vacuum compartment 20, whereby the plastic film 3 was press-bonded to the glass sheet 2. The laminated product 7 having the plastic film 3 press-bonded to the glass sheet 2 was taken out. Then, the laminated assembly 7 was put in an autoclave and heat pressed at a temperature of 140° C. under a pressure of 5 kg/cm² for 30 minutes.

The laminated product thus obtained had no scars or see-through distortion on the surface of the plastic film 3 and had an excellent see-through property.

EXAMPLE 3

A curved glass sheet (thickness: 3.5 mm) of a size of 1,400 mm×700 mm with a depth of curvature of 40 mm was washed with a washing agent and thoroughly cleaned for dust removal.

On the other hand, as the plastic film, a plastic film of a two-layer structure comprising a thermosetting polyurethane layer (thickness: 1.0 mm) having a self-healing property on the exposed surface side and a urethane adhesive layer (thickness: 0.02 mm) on the side to be bonded to the glass sheet, was prepared.

This plastic film was cut to have a size corresponding to the glass sheet. The glass sheet surface and the plastic film surface were thoroughly cleaned for dust removal.

A laminated assembly having the plastic film 3 overlaid on the glass sheet 2 was prepared.

The supporting outline of the support 13 was slightly larger than the outline of the glass sheet 2. The support was prepared from an epoxy resin and had a structure as shown in FIG. 6.

The laminated assembly 7 comprising the glass sheet 2 and the plastic film 3 was placed on the inner supporting edge of the circumferential frame 15 of the support 13 with the gasket 36 interposed therebetween as shown in FIG. 6. A film holding apparatus 14 to which a cover film 32 provided with embosses of from 3 to 7 μm over the entire surface facing to the plastic film 3 was attached, was placed on the circumferential frame 15 with a gasket 35 interposed therebetween, and secured. Then, a first vacuum compartment constituted by the cover film 32, the backing film 33, the film-holding apparatus 14 and the gaskets 35 and 36 and containing the laminated assembly 7 of the glass sheet 2 and the plastic film 3, was formed in the second vacuum compartment 10, so that the space between the glass sheet 2 and the plastic film 3 can be deaerated for preliminary press-bonding. Then, the cover 29 of the vacuum compartment 10 was closed, and the second vacuum compartment 10 and the first vacuum compartment 20 were evacuated from vacuuming ducts 16 and 18, respectively, to a level of 1 mmHg. Then, atmospheric air was introduced from the vacuuming duct 16 into the vacuum compartment 10 outside the first vacuum compartment 20, whereby the plastic film 3 was press-bonded to the glass sheet 2. The laminated assembly 7 having the plastic film 3 press-bonded to the glass sheet 2 was taken out. Then, the laminated assembly 7 was put in an autoclave and heat pressed at a temperature of 140° C. under a pressure of 5 kg/cm² for 30 minutes.

The laminated product thus obtained had no scars or see-through distortion on the surface of the plastic film 3 and had an excellent see-through property.

EXAMPLE 4

A curved glass sheet (thickness: 3.5 mm) of a size of 1,400 mm × 700 mm with a depth of curvature of 50 mm having a baked print of black ceramics color ink with a width of 25 mm along the periphery, was washed with a washing agent and thoroughly cleaned for dust removal. Then, with a width of 20 mm along the periphery of the glass sheet, a urethane primer for the peripheral adhesion was applied in a thickness of from 2 to 5 μm.

On the other hand, as the plastic film, a plastic film having a two-layer structure comprising a thermosetting polyurethane layer (thickness: 1.0 mm) having a self-healing property on the exposed surface side and a polyurethane adhesive layer (thickness: 0.02 mm) on the side to be bonded to the glass sheet, was prepared.

This plastic film was cut to have a size corresponding to the glass sheet. The glass sheet surface and the plastic film surface were thoroughly cleaned for dust removal. A laminated assembly having the plastic film 3 overlaid on the glass sheet 2 provided along its periphery with the primer, was prepared.

The supporting outline of the support 13 was slightly larger than the outline of the glass sheet 2. The support was made of an epoxy resin and had a structure as shown in FIG. 6.

The laminated assembly 7 comprising the glass sheet 2 and the plastic film 3 was placed on an inner supporting edge of the circumferential frame 15 of the support 13 with the gasket 36 interposed therebetween. A film holding apparatus 14 to which a cover film 32 provided with embosses of from 3 to 7 μm over the entire surface facing the plastic film 3, was attached, was placed on the circumferential frame 15 with the gasket 35 interposed therebetween, and secured. Then, a first vacuum compartment constituted by the cover film 32, the backing film 33, the film holding apparatus 14 and the gaskets 35 and 36, was formed in the second vacuum compartment 10 so that the space between the glass sheet 2 and the plastic film 3 can be evacuated for preliminary press-bonding. Then, the cover of the second vacuum compartment 10 was closed, and the second vacuum compartment 10 and the first vacuum compartment 20 were evacuated from the vacuuming ducts 16 and 18, respectively, to a level of 1 mmHg. Then, atmospheric air was introduced from the vacuuming duct 16 into the second vacuum compartment 10 outside the first vacuum compartment 20 to release the second vacuum compartment 10 from the vacuumed condition, whereby the plastic film 3 was press-bonded to the glass sheet 2. Then, the laminated assembly 7 having the plastic film 3 press-bonded to the glass sheet 2, was taken out. Then, this laminated assembly 7 was put in an autoclave and heat pressed at a temperature of 140° C. under a pressure of 5 kg/cm² for 30 minutes.

The laminated product thus obtained had no scars or see-through distortion on the surface of the plastic film 3 and had an excellent see-through property.

EXAMPLE 5

A curved glass sheet (thickness: 3.5 mm) having a size of 1,400 mm × 700 mm with a depth of curvature of 100 mm having a baked print of black ceramics color ink with a width of from 20 to 50 mm along the periphery, was washed with a washing agent and thoroughly cleaned for dust removal. Then, with a width of 20 mm along the periphery of the glass sheet, a urethane primer 6 for peripheral adhesion was applied in a thickness of from 2 to 5 μm.

On the other hand, as the plastic film, a plastic film having a two layer structure comprising a thermosetting polyurethane layer (thickness: 1.0 mm) having a self-healing property on the exposed surface side and a urethane adhesive layer (thickness: 0.02 mm) on the side to be bonded to the glass sheet, was prepared.

Figure 7:
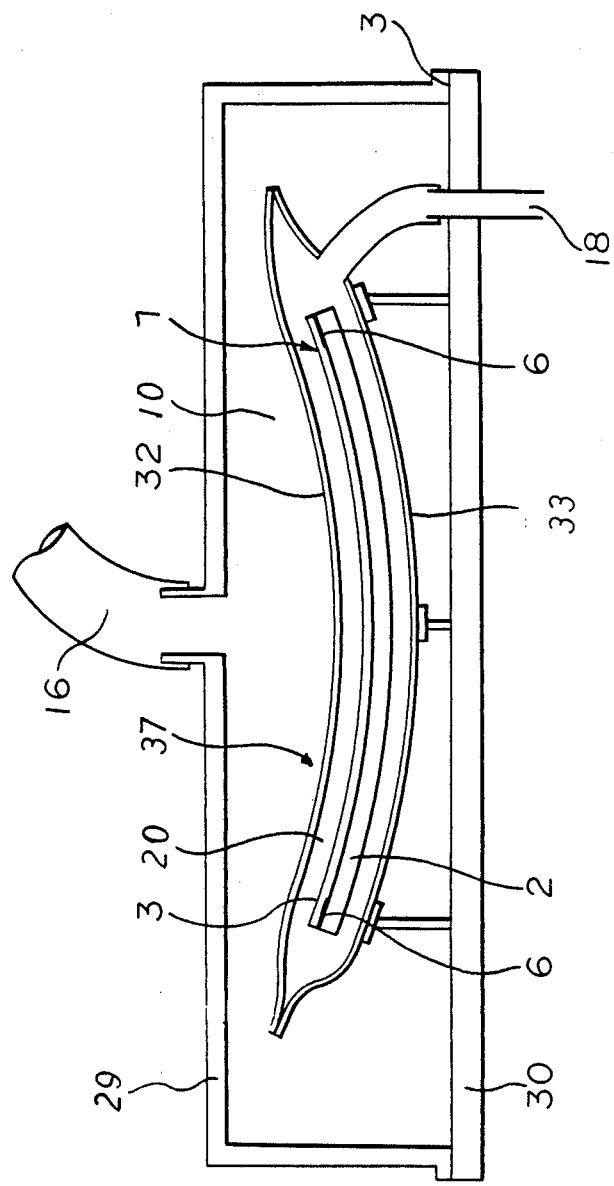
FIG. 7 illustrates a still another embodiment of the present invention.
Figure 8:
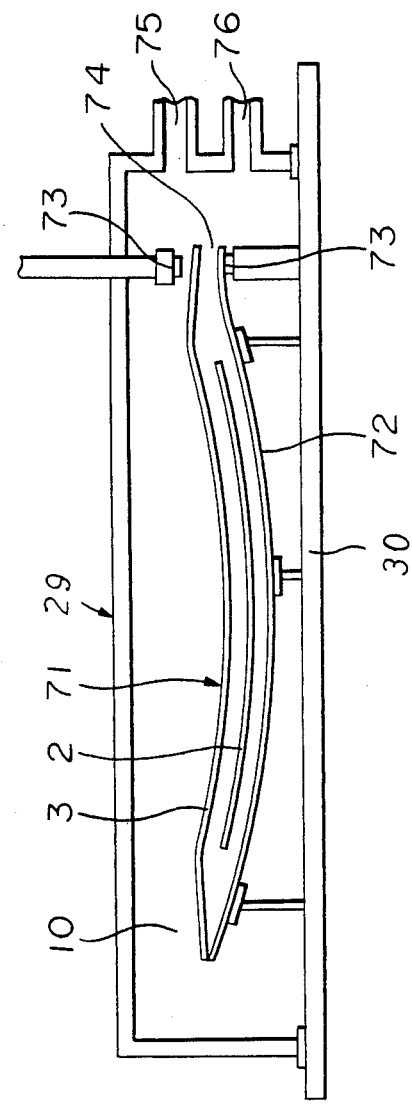
FIGS. 8 and 9 illustrate lamination methods proposed earlier by the present applicants.
Figure 9:
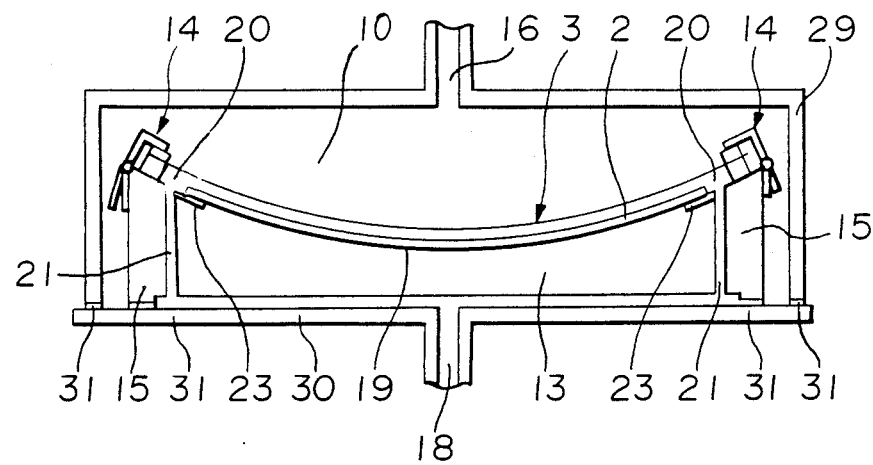

This plastic film was cut to have a size corresponding to the glass sheet. The cut plastic film 3 was put on the glass sheet 2 having the primer 6 applied along the periphery to obtain a laminated assembly 7. This laminated assembly 7 was placed in a vacuum packaging bag 37 as shown in FIG. 7 made of a cover film 32, 33 of a thermoplastic polyurethane film provided with surface roughness (irregularities) of from 3 to 7 μm on the side facing to the plastic film of the laminated assembly, to form a first vacuum compartment 20. This vacuum packaging bag 37 was placed in the second vacuum compartment 10, and the cover 29 was closed. Then, the second vacuum compartment 10 and the first vacuum compartment 20 were evacuated from the vacuuming duct 16 and the vacuuming duct 18, respectively, to a level of 1 mmHg. Then, atmospheric air was introduced from the vacuuming duct 16 into the vacuum compartment 10 outside the first vacuum compartment 20, to release the second vacuum compartment 10 from the vacuumed condition, whereby the plastic film 3 was press-bonded to the glass sheet 2, and the glass sheet 2 and the plastic film 3 were sealed with the primer 6 for the peripheral adhesion interposed therebetween. Then, the laminated assembly 7 was taken out from the vacuum packaging bag 37. The atmospheric temperature was then 21° C. Then, the laminated assembly was placed in an autoclave and heat-pressed at 140° C. under a pressure of 5 kg/cm$^2$ for 30 minutes.

The laminated product thus obtained had no scars or see-through distortion on the surface of the plastic film 3 and had an excellent see-through property. Further, no peeling of the baked print of black ceramics color ink was observed.

EXAMPLE 6

A curved glass sheet (thickness: 3.0 mm) of a size of 340 mm×440 mm with a depth of curvature of 30 mm having a baked print of black ceramics color ink with a width of 15 mm along the periphery, was washed with a washing agent and thoroughly cleaned for dust removal. With a width of 20 mm along the periphery of the glass sheet, a urethane primer 6 for peripheral adhesion was applied in a thickness of from 2 to 5 μm.

On the other hand, as the plastic film, a plastic film having a two layer structure comprising thermosetting polyurethane layer (thickness: 1.0 mm) having a self-healing property on the exposed surface side and a urethane adhesive layer (thickness: 0.02 mm) on the side to be bonded to the glass sheet, was prepared.

This plastic film was cut to have a size corresponding to the glass sheet. The cut plastic film 3 was put on the glass sheet 2 having the primer 6 applied along its periphery to obtain a laminated assembly 7. This laminated assembly 7 was placed in a vacuum packaging bag 37 as shown in FIG. 7 lined, on the side of the plastic film 3, with a nylon cloth 32 composed of a total of warps and wefts of 190 per square inch with 70 denier and, on its outside, with a cloth coated with a resin of SVR and EVA, to form a first vacuum compartment 20. Then, this vacuum compartment 20 was placed in the second vacuum compartment 10, and the cover 29 was closed. Then, the second vacuum compartment 10 and the first vacuum compartment 20 were evacuated from the vacuuming duct 16 and the vacuuming duct 18, respectively, to a level of 1 mmHg. Then, atmospheric air was introduced from the vacuuming duct 16 into the vacuum compartment 10 outside the first vacuum compartment 20, to release the vacuum compartment 10 from the vacuumed condition, whereby the plastic film 3 was press-bonded to the glass sheet 2, and the glass sheet 2 and the plastic film 3 were sealed with the primer 6 for the peripheral adhesion interposed therebetween. Then, the laminated product was taken out from the vacuum packaging bag. The atmospheric temperature was then 21° C. Then, the laminated product was put in an autoclave and heat-pressed at a temperature of 140° C. under a pressure of 5 kg/cm$^2$ for 30 minutes.

The laminated product 7 thus obtained had no scars or see-through distortion on the surface of the plastic film 3 and has an excellent see-through property. Further, no peeling of the baked print of black ceramics color ink was observed.

As described in the foregoing, the present invention is directed to a method for press-bonding the plastic film to the sheet material such as a glass sheet, wherein at the time of stacking the sheet material and the plastic film to form a laminated assembly, a primer layer capable of adhering the plastic film and the sheet material at room temperature is applied to at least the peripheral portion. The first vacuum compartment defined by the sheet material and the plastic film and the second vacuum compartment surrounding the first vacuum compartment are independently evacuated, and then only the second vacuum compartment is released from the vacuumed condition by the introduction of atmospheric air thereinto, so that the plastic film is press-bonded to the surface of the sheet material and at the same time the sealing along the peripheral portion is carried out. Thus, the sealing along the peripheral portion can be carried out at room temperature without necessity of the conventional heat fusion by means of a heater provided on the conventional support table for heating the peripheral portion. Therefore, the press-bonding operation can be facilitated, and the cost can be reduced. The present invention also provides a method for press-bonding a plastic film to a sheet material such as a glass sheet, wherein a laminated assembly of a sheet material and a plastic film is placed in a first vacuum compartment defined by a cover film which has a roughened surface facing the plastic film to cover the plastic film. The first vacuum compartment and a second vacuum compartment enclosing the first vacuum compartment are independently evacuated, and then the second vacuum compartment is released from the vacuumed condition by the introduction of atmospheric air so that the cover film is pressed against the laminated assembly to press-bond the plastic film to the sheet material. Thus, the press-bonding operation can be simplified over the conventional method wherein an extra glass sheet is placed on the plastic film for press-bonding in a bag for the preliminary press-bonding. Further, as compared with the method of the Japanese patent application No. 51271/1985, use of the backing film which is wasted after use can be omitted, and the cost can be reduced accordingly. When compared with the methods of the same application and Japanese patent application No. 214137/1986, the extra portion of the plastic film beyond the sheet material is not required, and the cost can be reduced accordingly. Further, as compared with the method of Japanese Examined Pat. Publication No. 2140/1983, the press-bonding marks no longer remains on the plastic film, and a laminated product of good quality can be obtained even in the case of a complicated shape.

By using the cover film with roughened surface and the application of the primer layer to the peripheral portion of the assembly, the sealing can be conducted at room temperature, whereby a laminated product of good quality is obtainable without transfer of irregularities. Further, even when the sheet material is a glass sheet having a baked print of black ceramics ink, the press-bonding can be carried out without peeling of the baked print along the periphery.

As mentioned above, according to the present invention, the press-bonding operation can be facilitated and the cost can be reduced. Further, a laminated product of high quality can be obtained without wrinkles, irregularities or scars on the plastic film surface or without optical distortion. Thus, the present invention is most suitable for the production of a safety glass for which surface properties of high quality are required, such as a safety glass wherein a plastic film is laminated on the interior side of a single glass sheet or a laminated glass sheet for windows of automobiles and other various transportation vehicles or aircrafts, to provide breaking resistance or damage resistance to prevent the damage to the skin of the passenger at the time of the breakage of the glass sheet, and in some cases, to provide penetration resistance.

What is claimed as new and desired to be secured by Letters Patent of the U.S. is:

1. A method for press-bonding a laminated assembly of a sheet material and a plastic film, which comprises stacking a sheet material cut to have a predetermined shape and a plastic film, evacuating a first vacuum compartment formed by the plastic film, a circumferential frame for spreading the plastic film, the sheet material and a gasket to thereby evacuate the space between the plastic film and the sheet material and at the same time, evacuating a second vacuum compartment enclosing at least the plastic film side of the first vacuum compartment and separated from the first compartment, and then releasing the second vacuum compartment from the vacuumed condition so that the plastic film is press-bonded to the sheet material, wherein a primer layer capable of adhering at room temperature is applied, and said primer layer is provided at only the substantially peripheral portion of said sheet and wherein said first vacuum compartment is evacuated through at least one duct which forms a part of said circumferential frame.

2. The method according to claim 1, wherein the plastic film has a self-healing property.

3. The method according to claim 1, wherein the sheet material is a glass sheet.

4. The method according to claim 1, wherein the plastic film has embosses with a depth of from 0.1 to 5 μm on the side facing the sheet material.

5. A method for press-bonding a laminated assembly of a sheet material and a plastic film, which comprises stacking a sheet material cut to have a predetermined shape and a plastic film having a self-healing property to form a laminated assembly, placing a cover film having a roughened surface on the side facing the plastic film of the laminated assembly so as to be in contact with the plastic film and cover the entire surface of the plastic film, evacuating a first vacuum compartment formed by the cover film, a circumferential frame for spreading the cover film, the sheet material and a gasket to thereby evacuate the space between the plastic film and the sheet material and at the same time, evacuating a second vacuum compartment enclosing at least the outer side of the cover film constituting the first vacuum compartment and separated therefrom, and then releasing the second vacuum compartment from the vacuumed condition so that the plastic film is press-bonded to the sheet material, wherein a primer layer capable of adhering at room temperature is applied, and said primer layer is provided at only the substantially peripheral portion of said sheet and wherein said first vacuum compartment is evacuated through at least one duct which forms a part of said circumferential frame.

6. The method according to claim 5, wherein the sheet material is a glass sheet.

7. The method according to claim 5, wherein the roughened surface of the cover film is formed on the side facing the plastic film and has a surface roughness of from 0.5 to 70 μm.

8. The method according to claim 7, wherein the roughness of the roughened surface is in the range of from 2 to 40 μm.

9. The method according to claim 5, wherein the cover film is provided with a cloth material having a surface roughness of from 0.5 to 70 μm on the side facing the plastic film.

10. The method according to claim 9, wherein the surface roughness of the cloth material is in the range of from 2 to 40 μm.

* * * * *